US012691755B2

(12) United States Patent
Natarajan et al.

(10) Patent No.: US 12,691,755 B2
(45) Date of Patent: Jul. 28, 2026

(54) POWER TRANSMISSION SYSTEM FOR A WORK MACHINE

(71) Applicant: Mahindra and Mahindra Limited, Tamilnadu (IN)

(72) Inventors: Saravanan Natarajan, Tamilnadu (IN); Sivakumar Arumugham, Tamilnadu (IN); Mohd Ali Abbaas, Tamilnadu (IN); Pavithra Sundaram, Tamilnadu (IN); Arjun Prabhakaran, Tamilnadu (IN); Gokila Ayyasamy, Tamilnadu (IN); Deepak Saini, Tamilnadu (IN)

(73) Assignee: Mahindra and Mahindra Limited, Tamilnadu (IN)

( * ) Notice: Subject to any disclaimer, the term of this patent is extended or adjusted under 35 U.S.C. 154(b) by 0 days.

(21) Appl. No.: 18/281,040

(22) PCT Filed: Mar. 13, 2023

(86) PCT No.: PCT/IB2023/052394
§ 371 (c)(1),
(2) Date: Sep. 8, 2023

(87) PCT Pub. No.: WO2024/127091
PCT Pub. Date: Jun. 20, 2024

(65) Prior Publication Data
US 2025/0289304 A1     Sep. 18, 2025

(30) Foreign Application Priority Data
Dec. 12, 2022     (IN) .............................. 202241071698

(51) Int. Cl.
*B60K 17/28* (2006.01)
*B60K 25/06* (2006.01)

(52) U.S. Cl.
CPC .............. *B60K 17/28* (2013.01); *B60K 25/06* (2013.01)

(58) Field of Classification Search
CPC ................................ B60K 25/06; B60K 17/28
See application file for complete search history.

(56) References Cited

U.S. PATENT DOCUMENTS 4,669,562 A * 6/1987 Taga ...................... B60K 17/28
                                                    180/53.1
5,669,842 A * 9/1997 Schmidt ................. B60K 6/365
                                                    903/910

(Continued)

FOREIGN PATENT DOCUMENTS

JP        2001-105910 A      4/2001
WO     WO-2020/0187989 A1    9/2020
WO     WO-2024134274 A1 *    6/2024 ............... F16H 3/14

OTHER PUBLICATIONS

International Search Report and Written Opinion for Application No. PCT/IB2023/052394, dated Jun. 26, 2023.

*Primary Examiner* — Laura Freedman
(74) *Attorney, Agent, or Firm* — MARSHALL, GERSTEIN & BORUN LLP

(57)     ABSTRACT

The present disclosure relates a power transmission system (100) for a work machine (50). The work machine is defined by drive wheels (14) for driving the work machine and a power take off (PTO) shaft (18) for driving a plurality of implements attached to the work machine. The system (100) comprises a first prime mover (10), a second prime mover (16), a first gear (20), a second gear (22), an engaging unit (24) and a switch. The engaging unit (24) is configured to be operatively mounted on the PTO shaft (18). The engaging unit (24) is configured to be displaced on the PTO shaft (18) from an idling configuration to an engaging configuration based on the satisfaction of a predetermined set of condi- (Continued)

100 ⌐ tions. The system provides the compact assembly without any additional requirement of any external transmission assembly. Also, it makes the coupling response quick and provides smooth and noise free shifting and coupling of gears.

9 Claims, 5 Drawing Sheets

(56) References Cited

U.S. PATENT DOCUMENTS

| | | | | |
|---|---|---|---|---|
| 6,048,288 | A * | 4/2000 | Tsujii | B60W 10/30 |
| | | | | 903/910 |
| 6,598,496 | B2 * | 7/2003 | Pannell | B60K 6/46 |
| | | | | 180/65.245 |
| 6,658,852 | B2 * | 12/2003 | Frey | B60L 15/2009 |
| | | | | 60/716 |
| 7,104,920 | B2 * | 9/2006 | Beaty | B60W 10/30 |
| | | | | 477/5 |
| 7,391,129 | B2 * | 6/2008 | Chiao | B60L 50/16 |
| | | | | 307/9.1 |
| 7,547,264 | B2 * | 6/2009 | Usoro | B60W 10/08 |
| | | | | 903/910 |
| 8,469,127 | B2 * | 6/2013 | Tarasinski | B60K 6/26 |
| | | | | 180/65.285 |
| 8,770,327 | B2 * | 7/2014 | Yamada | B60K 6/383 |
| | | | | 180/65.22 |
| 8,978,798 | B2 * | 3/2015 | Dalum | B60L 1/003 |
| | | | | 180/65.22 |
| 9,878,616 | B2 * | 1/2018 | Dalum | B60K 25/00 |
| 11,124,058 | B2 * | 9/2021 | Stoltz | B60W 30/1888 |
| 11,691,504 | B2 * | 7/2023 | Langenderfer | B60K 1/00 |
| | | | | 475/5 |
| 12,158,204 | B1 * | 12/2024 | Cattoor | F16H 3/728 |
| 2012/0013132 | A1 * | 1/2012 | LeBeau | B60K 25/02 |
| | | | | 903/902 |
| 2022/0134860 | A1 * | 5/2022 | Dannerbauer | B60K 6/36 |
| | | | | 477/5 |
| 2025/0313084 | A1 * | 10/2025 | Natarajan | B60K 17/28 |

* cited by examiner

POWER TRANSMISSION SYSTEM FOR A WORK MACHINE

FIELD

The present disclosure relates to a power transmission system for a work machine and, more particularly, to a multi-motor drive system with a coupling arrangement for driving implements mounted to a power take off (PTO) shaft.

Definition

As used in the present disclosure, the following terms are generally intended to have the meaning as set forth below, except to the extent that the context in which they are used indicate otherwise.

IDLING CONFIGURATION: The term 'idling configuration' used in the context of this disclosure refers to a configuration when a gear rotates around a shaft without affecting the movement or rotation of the shaft or without being affected by the rotation of the shaft.

ENGAGING CONFIGURATION: The term 'engaging configuration' used in the context of this disclosure refers to a configuration in which a gear engages the PTO shaft to enable the gear to be driven by the PTO shaft.

WHEEL: The term 'wheel' used in the context of this disclosure refers to, the wheel by which the work machine is able to move on the road or OFF road.

THROTTLE CONTROL MECHANISM: The term 'throttle control mechanism' used in the context of this disclosure refers to, variation of speed and torque based on the pressing of the work machine accelerator pedal.

BACKGROUND

The background information herein below relates to the present disclosure but is not necessarily prior art.

Generally, work machines, such as agricultural tractors, are used to perform many tasks. To effectively perform the assigned tasks, a work machine requires a power source such as an internal combustion engine (ICE) to propel the work machine.

The ICE driven work machines i.e. agricultural tractors are used to perform functions that require a high output torque and a relatively low maximum ground speed. Further, these work machines are often used to drive a plurality of implements by attaching the implements with a power take off shaft. The PTO shaft is commonly used for driving a rotavator, a thresher, a sprayer, and other similar machines that require an auxiliary power input.

Conventionally, the ICE of the work machines is configured to deliver a defined limit of torque, and beyond which the engines fails to supply the required torque. However, throttle control mechanisms allow users to use the maximum limit of available torque. But, when the torque requirement by the PTO shaft exceeds the available torque delivered from the engine, the engine stalls or fails.

Typically, a traditional electric tractor has two motors, for example, a first motor of defined torque to drive the work machine and a second motor, such as a PTO motor of defined torque to drive the implements installed on the PTO shaft. Sometimes, the implements or equipments like a thresher; a rotavator, a pump etc. are loaded with an extra load of grains or used to draw water from a deep well, adding burden on the PTO motor. Since the PTO motor is configured to deliver the defined limit of torque, the PTO motor fails to supply the required driving torque to the implements when the load increases, which causes the implements to stops its operation. Therefore, the power of the single PTO motor is sometimes not enough to meet the requirements of agricultural operations.

Thus, there is felt a need for a power transmission system for a work machine which can achieve the desired torque and that alleviates the aforementioned drawbacks.

Objects

Some of the objects of the present disclosure, which at least one embodiment herein satisfies, are as follows:

An object of the present invention is to provide a power transmission system for a work machine.

Another object of the present invention is to provide a power transmission system which facilitates the coupling of one or more prime movers to meet the desired torque or power requirements of an implement.

Still another object of the present invention is to provide a power transmission system for a work machine with compact arrangement of gears and engaging unit.

Yet another object of the present invention is to provide a power transmission system for a work machine that avoids overloading and overheating of prime movers.

Still another object of the present invention is to provide a power transmission system for a work machine which avoids the use of oversize prime movers.

Still another object of the present invention is to provide a power transmission system for a work machine which provides smooth and noise free shifting or coupling of gears for auxiliary power transmission to an attached implement.

Yet another object of the present invention is to provide a power transmission system for a work machine which makes the shifting and coupling of different prime movers quick.

SUMMARY

The present disclosure envisages a power transmission system for a work machine. The work machine is defined by drive wheels for driving the work machine and a power take off shaft (PTO) for driving a plurality of implements attached to the work machine. The system is configured to provide on demand additional driving power to the PTO shaft. The system comprises a first prime mover, a second prime mover, a first gear, a second gear, an engaging unit, and a switch.

The first prime mover is configured to engage a first shaft and further configured to drive wheels of the work machine. The second prime mover is configured to engage the power take off (PTO) shaft of the work machine to drive a plurality of implements. The first gear is rigidly mounted on the first shaft, and the second gear is mounted on the PTO shaft in such a way that the first gear is configured to be engaged with the second gear, thereby the first gear drives the second gear in an operative configuration of the system. An idler gear mounted on an intermittent shaft to ensure rotation of the first and PTO shaft in same direction. The engaging unit is configured to be operatively mounted on the PTO shaft. The engaging unit is configured to be controllably displaced on the PTO shaft from an idling configuration to an engaging configuration.

Further, the engaging unit is configured to be actuated by means of the switch. The switch is operated manually by a user to activate the engaging unit as per the power requirement. Once the switch is pressed, the engaging unit is configured to be displaced from the idling configuration to the engaging configuration to engage with an operative portion of the second gear. Thereby, the first prime mover transmits the additional driving power from the first shaft to the PTO shaft to compensate the auxiliary power requirements of the implements attached therewith. The switch is configured to control the displacement of the engaging unit.

In a preferred embodiment, the operation of the actuator is configured to remain in actuated state until the switch is switched OFF.

Further, the system comprises an electronic control unit (ECU). The ECU is configured to be in communication with a plurality of sensors and the actuator. The actuator is configured to be activated by means of pressing the switch.

In an embodiment, the plurality of sensors are selected from a group consisting of a first and a second current sensor, a first and a second speed sensor, and a first and a second direction sensor, for the first and the second prime movers, respectively.

The ECU is configured to trigger the actuator in response to occurrence of the following predetermined set of conditions:

the current sensed by the first current sensor is less than a predetermined threshold current;

synchronization of speed of the first prime mover with the second prime mover;

the direction of rotation of the first prime mover as sensed by the first direction sensor is same with respect to the direction of rotation of the second prime mover as sensed by the second direction sensor.

BRIEF DESCRIPTION OF THE ACCOMPANYING DRAWING

A power transmission system for a work machine, of the present disclosure will now be described with the help of the accompanying drawings, in which.

Figure 1:
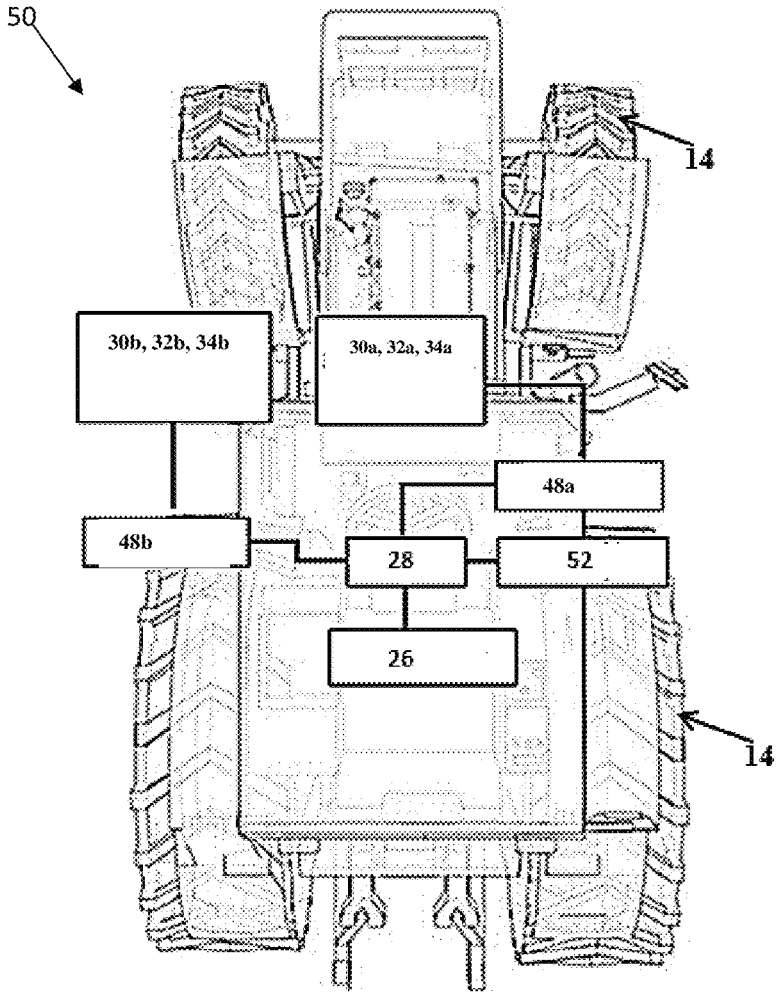
FIG. 1 illustrates an assembly of a plurality of prime movers of a work machine in communication with a plurality of sensors and electronic control unit (ECU) in accordance with an embodiment of the present disclosure.

LIST OF REFERENCE NUMERALS USED IN DETAILED DESCRIPTION AND DRAWING 100 power transmission system
50 work machine
10 first prime mover
12 first shaft
14 wheels
16 second prime mover
18 power take off (PTO) shaft
20 first gear 22 second gear
24 engaging unit
26 actuator
28 electronic control unit (ECU)
30a first current sensor
30b second current sensor
32a first speed sensor
32b second speed sensor
34a first direction sensor
34b second direction sensor
36a hub
36b sleeve
38 circumferential groove
40 fork
42 dog teeth
44 cone
46 idler gear
48a first prime mover controller
48b second prime mover controller
52 switch
54 elongated member or lever

DETAILED DESCRIPTION

Embodiments of the present disclosure will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known grader structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an", and "the" may be intended to include the plural forms as well, unless the context clearly suggests otherwise. The terms "comprises", "comprising", "including", and "having", are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to", or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region or section from another component, region, or section. Terms such as first, second, third etc., when used herein do not imply a specific sequence or order unless clearly suggested by the present disclosure.

Terms such as "inner", "outer", "beneath", "below", "lower", "above", "upper", and the like, may be used in the present disclosure to describe relationships between different elements as depicted from the figures.

Conventionally, an internal combustion engine (ICE) driven work machine is designed for a defined limit of torque, and beyond which the engine fails to supply the required torque. However, throttle control mechanisms allow users to use the maximum limit of available torque. But, when the torque requirement by the PTO shaft exceeds the available torque delivered from the engine, the engine stalls or fails.

Further, a traditional electric tractor generally configured with two motors, for example, a first motor of defined torque to drive the work machine and a second motor, such as a PTO motor of defined torque to drive the implements installed on the PTO shaft. Sometimes, the implements or equipments like a thresher, a rotavator, a pump etc. are loaded with an extra load of grains or used to draw water from a deep well, which adds burden on the PTO motor. Since the PTO motor is configured to deliver the defined limit of torque, the PTO motor fails to supply the required driving torque to the implements when the load increases, which causes the implements to stop its operation.

In order to address the aforementioned problems, the present disclosure envisages a power transmission system for a work machine (hereinafter referred as system 100) as shown in FIG. 1. The work machine (50) is defined by drive wheels (14) for driving the work machine (50) and a power take off (PTO) shaft (18) for driving a plurality of implements attached to the work machine (50). The system (100) is configured to provide on demand additional driving power to the PTO shaft (18). According to the present disclosure, the automotive power transmission system (100) comprises a first prime mover (10), a second prime mover (16), a first gear (20), a second gear (22), an engaging unit (24) and a switch (52). The first prime mover (10) is in communication with a differential to drive a plurality of wheels (14), whereas the second prime mover (16) is configured to drive rotating implements or equipments, pumps etc, which requires a driving power. The first prime mover (10) and the second prime mover (16) are configured to connect with a plurality of sensors to sense and monitor real time parameters such as current, speed and direction of the respective prime movers (10, 16). Further, the first prime mover (10) and the second prime mover (16) are configured to be in communication with a first prime mover controller (48a) and a second prime mover controller (48b), to thereby control and modulate the different parameters of the respective prime movers (10, 16), as per the system demand. The switch (52) is configured to control the displacement of the engaging unit (24). FIG. 1 illustrates an assembly of a plurality of prime movers of a work machine (50) in communication with a plurality of sensors and electronic control unit (ECU) in accordance with an embodiment of the present disclosure.

In an embodiment, the first prime mover (10) and second prime mover (16) are electric driven motors or any driving members.

In another embodiment, the first prime mover (10) and second prime mover (16) are a traction motor and a PTO motor respectively.

In another embodiment, the switch (52) is selected from a group consisting of an inductive switch, a capacitive switch, a contact type switch, or a toggle switch.

In another embodiment, the automotive work machine is an electric tractor or agro-farm machines, configured with the at least two prime movers.

Figure 2:
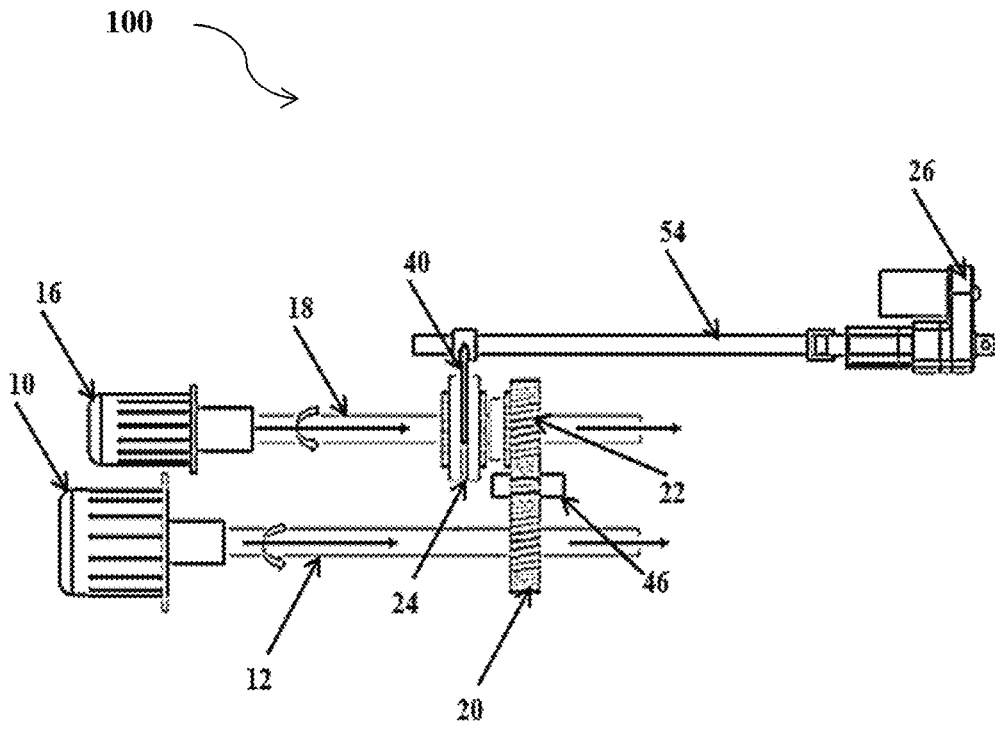
FIG. 2 illustrates a side view of a power transmission system with a first prime mover, a second prime mover and an actuator in an ideal mode in accordance with an embodiment of the present disclosure.
Figure 3:
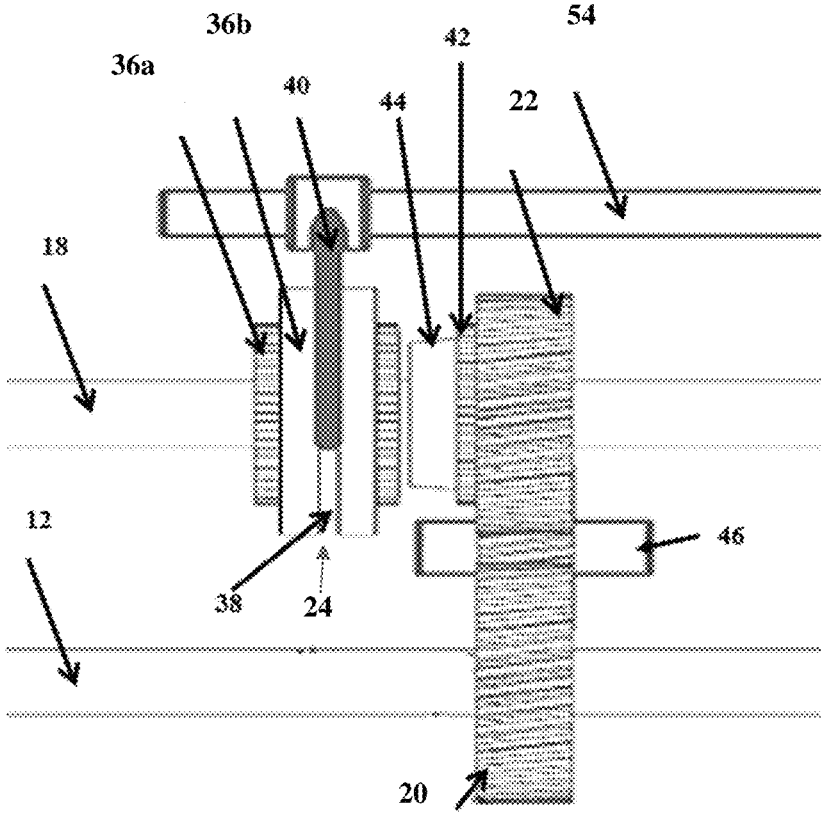
FIG. 3 illustrates a sectional view of gears engagement of a power transmission system with a fork configured on an engaging unit in accordance with an embodiment of the present disclosure.

Further, the plurality of sensors is selected from a group consisting of a first and a second current sensor (30a, 30b), a first and a second speed sensor (32a, 32b), and a first and a second direction sensor (34a, 34b), for the first and the second prime movers (10, 16), respectively. With continued reference to FIG. 1, a side view and a sectional view of the system 100 is shown in FIG. 2 and FIG. 3. According to the present disclosure, the first shaft (12) is configured to be engaged with the first prime mover (10), and whereas the PTO shaft (18) is configured to be engaged with the second prime mover (16). Thus, the driving power from the first prime mover (10) reaches to the differential of the wheels (14) by means of the first shaft (12), and the driving power from the second prime mover (16) reaches to the rotating implements by means of the PTO shaft (18).

The first gear (20) is being fixedly mounted on the first shaft (12), and the second gear (22) is being freely mounted on the PTO shaft (18). Thus, with the rotation of the first shaft (12), the first gear (20) mounted on the first shaft (12) is also rotating. The second gear (22) is being configured to remain in an engaged configuration with the first gear (20), to thereby transmit power there through in an operative configuration of the power transmission system (100). An operative face of the second gear (22) is configured with a plurality of dog teeth (42) and a cone (44) thereon. FIG. 2 illustrates a side view of the power transmission system with the first prime mover, the second prime mover and an actuator in an ideal mode.

In an embodiment, the second gear (22) is freely mounted on the PTO shaft (18) by means of at least one needle bearing. Therefore, the second gear (22) mounted on the PTO shaft (18) is freely rotating while the first gear (20) mounted on the first shaft (12) rotates with the rotation of the first shaft (12).

In another embodiment, the system (100) includes at least one idler gear (46), intermediately meshed with the first gear (20) and the second gear (22). Therefore, by means of only one idler gear (46), same direction of rotation is achieved between the first gear (20) and the second gear (22).

Further, the engaging unit (24) is configured to be mounted on the PTO shaft (18). The engaging unit (24) is defined by a sleeve-hub arrangement. An inner surface of the sleeve (36b) is configured with a plurality of protrusions and an outer surface of the sleeve (36b) is configured with a circumferential groove (38). The hub (36a) is configured to be mounted on the PTO shaft (18) in such a way that the hub (36a) rotates with the rotation of the PTO shaft (18). The hub (36a) is provided with a plurality of grooves on an external surface of the hub (36a). The plurality of internal protrusions of the sleeve (36b) slidably meshes with the plurality of external grooves of the hub (36a) and thus forms the sleeve-hub arrangement.

The circumferential groove (38) of the sleeve (36b) is configured to receive and engage a fork (40) therein. The actuator (26) is configured to be in communication with the fork (40) by means of an elongated member or lever (54), to operatively displace or slide the sleeve (36b) over the hub (36a) from idling configuration to an engaged configuration. Thus, with the press of switch (52), the actuator (26) selectively displaces the engaging unit (24) or the sleeve-hub arrangement from the idling configuration to the engaging configuration of the engaging unit (24) to engage with the second gear (22). FIG. 3 illustrates a sectional view of gears engagement of a power transmission system (100) with the fork (40) configured on the engaging unit (24).

In an embodiment, the hub (36*a*) is configured to be rigidly mounted on the PTO shaft (18), so that the hub (36*a*) rotates with the rotation of the PTO shaft (18).

In an embodiment, the operation of the actuator (26) is configured to remain in actuated state until the switch (52) is switched OFF.

In another embodiment, the PTO shaft (18) is configured with splines to engage the hub (36*a*) thereon. Therefore, the hub (36*a*) rotates with the rotation of the PTO shaft (18).

In another embodiment, the dog tooth (42) of the second gear (22) is configured to receive and engage with the internal protrusion of the sleeve (36*b*) in an operative configuration of the system (100).

In another embodiment, the engaging unit (24) is selected from a group consisting of a synchromesh gear or a clash-mesh gear.

In another embodiment, the actuator (26) is selected from a group consisting of a stepper motor, a solenoid actuator, a DC motor, an electromechanical motor or a combination thereof.

Further, the actuation or the triggering of the actuator (26) is being controlled by the electronic control unit (ECU) (28). The ECU (28) is configured to be in communication with the plurality of sensors. The ECU (28) receives the sensed signal from the plurality of sensors and compares the sensed signal value with a preset value of at least one desired parameter stored in the ECU (28) based on a predetermined set of conditions. Based on the comparison, the ECU (28) is configured to communicate a response to enable the operation of the actuator (26) for rightward or backward movement of the engaging unit (24).

In an embodiment, the desired parameter is selected from a group consisting of speed, current and direction of rotation of the first prime mover (10) and the second prime mover (16) as sensed by the first and the second current sensor (30*a*, 30*b*), the first and the second speed sensor (32*a*, 32*b*), and the first and the second direction sensor (34*a*, 34*b*).

Further, the ECU (28) triggers the actuator (26) in response to the occurrence or satisfaction of the following predetermined set of conditions:

the current sensed by the first current sensor (30*a*) is less than a predetermined threshold current;

synchronization of speed of the first prime mover (10) with the second prime mover (16); and the direction of rotation of the first prime mover (10) as sensed by the first direction sensor (34*a*) is same with respect to the direction of rotation of the second prime mover (16) as sensed by the second direction sensor (34*b*).

Based on the satisfaction of the predetermined set of conditions, the ECU (28) is configured to communicate a response to the actuator (26) to selectively orient the engaging unit (24) from the idling configuration to the engaging configuration, and further configured to engage with the second gear (22) to transmit additional driving power from the first prime mover (10) to the second prime mover (16) in an operative configuration of the system (100) to provide the auxiliary power to drive the different implements.

Figure 4:
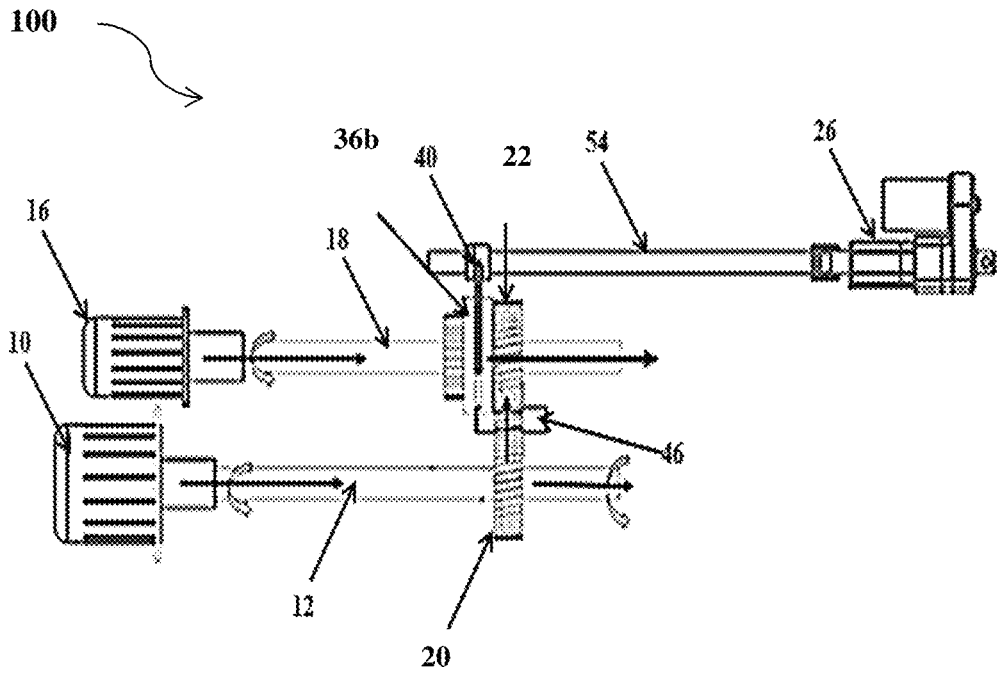
FIG. 4 illustrates a side view of a power transmission system during backward sliding of an engaging unit to engage with second gear in accordance with an embodiment of the present disclosure.

In an embodiment, the ECU (28) is configured to trigger the actuator (26) to selectively displace the sleeve (36*b*) in an operative backward direction to engage with an operative face of the set of second gear (22) when the first direction sensor (34*a*) senses same direction of rotation of the first prime mover (10) with respect to the direction sensed by the second direction sensor (34*b*) for the second prime mover (16). FIG. 4 illustrates a side view of a power transmission system (100) during backward sliding of an engaging unit to engage with second gear (22).

Figure 5:
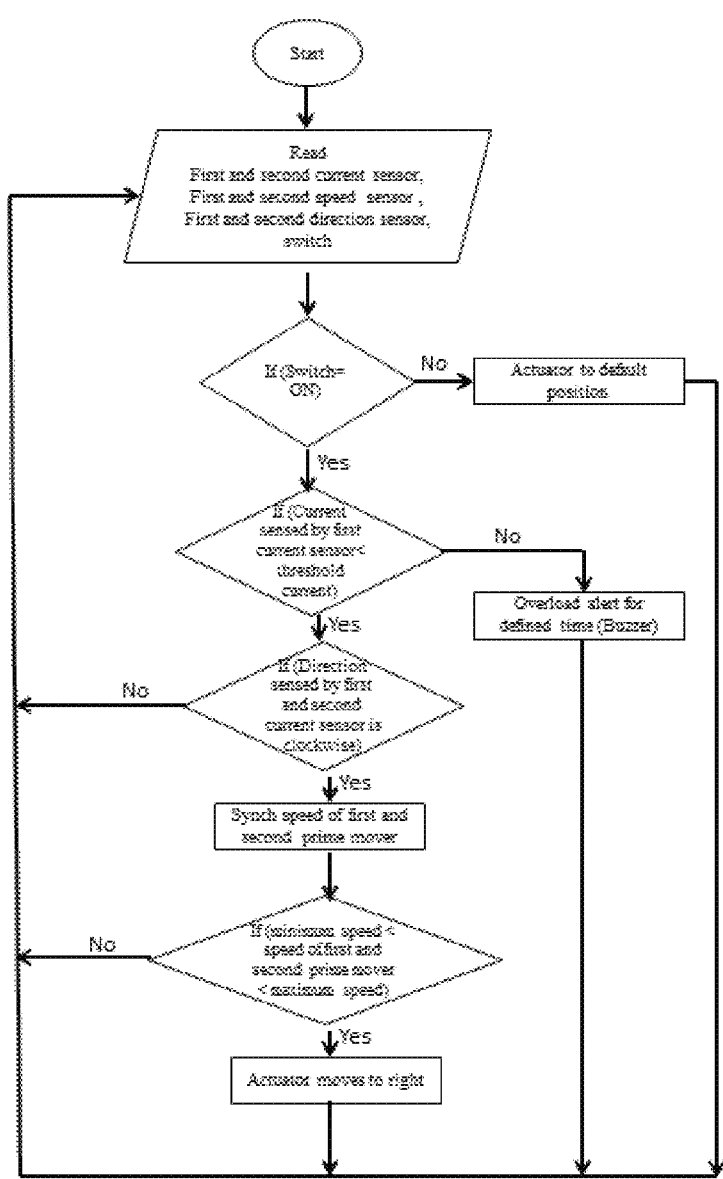
FIG. 5 illustrates a flow chart for a sequence of operation performed by an Electronic Control Unit (ECU) in accordance with an embodiment of the present disclosure.

Since, the ECU (28) is in communication with the plurality of sensors (30*a*, 30*b*, 32*a*, 32*b*, 34*a*, 34*b*) and the actuator (26), thus the coupling of the engaging unit (24) with the second gear (22) is controlled based on the satisfaction of the predetermined set of conditions. Therefore, the system (100) avoids the overloading and overheating of the prime movers (10, 16). FIG. 5 illustrates a flow chart for a sequence of operation performed by an Electronic Control Unit (ECU).

Advantageously, the engaging unit (24) of the system (100) facilitates the transmission of power from the first prime mover (10) to the second prime mover (16); therefore, the system (100) provides the desired or required torque as demanded by the system (100).

Since, the engaging unit (24) is configured with the PTO shaft (18); the system (100) provides the compact assembly without any additional requirement of any external transmission assembly. Also, it makes the coupling response quick and provides smooth and noise free shifting and coupling of gears.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements and Economic Significance

The present disclosure described herein above has several technical advantages including, but not limited to, the realization of the power transmission system for a work machine, that:

facilitates the power transmission from the traction motor to the PTO motor to drive different implements to meet the desired torque or power requirements;

provides compact arrangement of gears and coupler;

avoids the overloading and overheating of the prime movers;

avoids the requirements of oversize prime movers;

provides smooth and noise free shifting or coupling of gears for additional power transmission; and makes the shifting and coupling response quick.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A power transmission system (100) for a work machine (50), the work machine (50) defined by drive wheels (14) for driving the work machine (50) and a power take off (PTO) shaft (18) for driving a plurality of implements attached to the work machine (50), said system (100) configured to provide on demand additional driving power to said PTO shaft (18), said system (100) comprising:

a first prime mover (10) configured to engage a first shaft (12) and further configured to drive the drive wheels (14) of the work machine (50);

a second prime mover (16), configured to engage said power take off (PTO) shaft (18) of the work machine (50) to drive the plurality of implements;

a first gear (20) mounted on said first shaft (12);

a second gear (22), mounted on said PTO shaft (18), said first gear (20) configured to be engaged with said second gear (22), to thereby drive said second gear (22);

an engaging unit (24), mounted on said PTO shaft (18), said engaging unit (24) configured to be controllably displaced from an idling configuration to an engaging configuration;

an actuator (26), configured to be in communication with said engaging unit (24), wherein said engaging unit (24) is defined by a sleeve-hub arrangement, said hub (36*a*) is configured to be mounted on said PTO shaft (18), to enable said sleeve-hub arrangement to rotate with said PTO shaft (18), an inner surface of said sleeve (36*b*) is configured with a plurality of protrusions to slidably mesh with a plurality of grooves on an external surface of said hub (36*a*), an outer surface of said sleeve (36*b*) is configured with a circumferential groove (38) to receive and engage a fork (40) therein, said fork (40) is configured to engage with said actuator (26), and further configured to slide said sleeve (36*b*) on said hub (36*a*) based on actuation of said actuator (26); and a switch, configured to control the displacement of said engaging unit (24).

2. The system (100) as claimed in claim 1, wherein said actuator (26)

configured to selectively displace said engaging unit (24) based on satisfaction of a predefined set of conditions.

3. The system (100) as claimed in claim 2, wherein said system (100) further comprises an electronic control unit (ECU) (28), configured to be in communication with a plurality of sensors (30*a*, 30*b*, 32*a*, 32*b*, 34*a*, 34*b*) and said actuator (26), said actuator (26) configured to be activated by pressing said switch (52).

4. The system (100) as claimed in claim 3, wherein said plurality of sensors (30*a*, 30*b*, 32*a*, 32*b*, 34*a*, 34*b*) is selected from a group consisting of a first and a second current sensor (30*a*, 30*b*), a first and a second speed sensor (32*a*, 32*b*), and a first and a second direction sensor (34*a*, 34*b*), for said first and said second prime movers (10, 16), respectively.

5. The system (100) as claimed in claim 4, wherein said ECU (28) is configured to receive sensed signal value from said plurality of sensors (30*a*, 30*b*, 32*a*, 32*b*, 34*a*, 34*b*) and compare said sensed signal value with a preset value of at least one corresponding desired parameter stored in said ECU (28) based on said predetermined set of conditions, and further configured to communicate a response based on the comparison to enable operation of said actuator (26), said at least one desired parameter is selected from a group consisting of speed, current, and direction of rotation of said first prime mover (10) and said second prime mover (16).

6. The system (100) as claimed in claim 5, wherein the operation of said actuator (26) is configured to remain in actuated state until said switch (52) is switched OFF.

7. The system (100) as claimed in claim 5, wherein said ECU (28) is configured to trigger said actuator (26) in response to occurrence of the following said predetermined set of conditions:

the current sensed by said first current sensor (30*a*) is less than a predetermined threshold current;

synchronization of speed of said first prime mover (10) with said second prime mover (16), and the direction of rotation of said first prime mover (10) as sensed by said first direction sensor (34*a*) is same with respect to the direction of rotation of said second prime mover (16) as sensed by said second direction sensor (34*b*).

8. The system (100) as claimed in claim 1, wherein an operative face of said second gear is configured with a plurality of dog teeth (42) and a cone (44) thereon, said plurality of dog teeth (42) is configured to receive and engage with said plurality of protrusions of said sleeve (36*b*) in an operative configuration of said transmission system (100).

9. The system (100) as claimed in claim 1, wherein said system (100) includes at least one idler gear (46) to intermediately mesh with said first gear (20) and said second gear (22).

\* \* \* \* \*